US012708851B2

(12) United States Patent
Schembri

(10) Patent No.: US 12,708,851 B2
(45) Date of Patent: Aug. 18, 2026

(54) SYSTEMS AND METHODS FOR CONTROLLING DIALOGUE COMPLEXITY IN VIDEO GAMES

(71) Applicant: Sony Interactive Entertainment Inc., Tokyo (JP)

(72) Inventor: Danjeli Schembri, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 187 days.

(21) Appl. No.: 18/454,530

(22) Filed: Aug. 23, 2023

(65) Prior Publication Data

US 2024/0091648 A1 Mar. 21, 2024

(30) Foreign Application Priority Data

Sep. 15, 2022 (GB) ..................................... 2213532

(51) Int. Cl.

*A63F 13/63* (2014.01)
*A63F 13/533* (2014.01)
*A63F 13/79* (2014.01)
*G06F 40/35* (2020.01)

(52) U.S. Cl.

CPC ............ *A63F 13/63* (2014.09); *A63F 13/533* (2014.09); *A63F 13/79* (2014.09); *G06F 40/35* (2020.01)

(58) Field of Classification Search

CPC ........ A63F 13/63; A63F 13/533; A63F 13/79; G06F 40/35

See application file for complete search history.

(56) References Cited

U.S. PATENT DOCUMENTS 5,358,259 A * 10/1994 Best ........................ A63F 13/47 463/31
2007/0011005 A1* 1/2007 Morrison ................. G09B 5/06 704/231
2019/0287339 A1* 9/2019 Oberberger ......... G07F 17/3244
2023/0201717 A1* 6/2023 Liang ...................... G10L 17/26 463/31

OTHER PUBLICATIONS

Combined Search and Examination Report for corresponding GB Application No. 2213532.1, 7 pages, dated Feb. 1, 2023.

* cited by examiner

*Primary Examiner* — Werner G Garner
(74) *Attorney, Agent, or Firm* — Fish & Richardson P.C.

(57) ABSTRACT

A method of controlling the complexity levels of dialogues in a video game, includes the steps of: loading a first dialogue from a game database according to a parameter related to complexity level of dialogue in user settings; outputting the first dialogue; accepting a user operation of in response to the first dialogue; adjusting the parameter related to complexity level of dialogues in user settings based on the user operation; loading a second dialogue from the game database according to the adjusted parameter related to complexity level of dialogue; and outputting the second dialogue.

20 Claims, 7 Drawing Sheets

200

SYSTEMS AND METHODS FOR CONTROLLING DIALOGUE COMPLEXITY IN VIDEO GAMES

BACKGROUND OF THE INVENTION

Field of the Invention

The present invention relates to systems and methods for controlling the complexity of dialogues and narratives in video games.

Description of the Prior Art

With the developments of video games from arcade video games to home video games, the game genres have also expanded from action games, such as shooting games and car racing games which mainly demand hand-eye coordination in an intensive short game period, to a diversity of new categories in which the players could spend a much longer playtime. These new game genres, such as adventure games, puzzle games, simulation games and role-playing games, often involve frequent interactions with the players. For instance, the players are required to make many decisions in the game which will steer the direction of the game plot. These story driven video games that require more sophisticated player interactions have also brought about changes to the complexity and depth of game narratives and character dialogues. Video game scripts can run up to one million English words so as to produce a rich and immersive game story. This is particularly the case when the game provides separate storylines in addition to the main storyline, or the game involves an open world instead of a linear story.

However, since complicated narratives and dialogues require language skills for interpretation, not all players are interested in going through the lengthy text of the narratives or character dialogues, which they may find less exciting than other game elements such as the game graphics. Some players may even find it difficult to concentrate on those extensive narratives or character dialogues. To these players, the sophisticated game scripts may inadvertently undermine the gaming experience.

Current approaches to handling extensive narratives or character dialogues in video games include providing a "skip" button for the player to bypass the relevant narratives or dialogues. Nevertheless, the conventional arrangements tend to suffer from one or more of a multiplicity of drawbacks:

Firstly, when the player skips a narrative or dialogue, s/he may miss some important ingredients that contribute to the storyline. These missing pieces of the story may lead to frustration in gameplay and the player may eventually lose interest in the game. Furthermore, the player may also miss out clues in the dialogues which are necessary for completing the main quests and advancing the game.

Secondly, some games may allow the player to configure the dialogue settings, for example, turning dialogue on or off. Nonetheless, this typically requires the player to navigate to a settings menu every time s/he wishes to change the dialogue settings, and hence interrupting the gaming experience.

The present invention seeks to mitigate or alleviate some or all of the above-mentioned problems.

SUMMARY OF THE INVENTION

Various aspects and features of the present invention are defined in the appended claims and within the text of the accompanying description.

In a first aspect, a method of controlling the complexity levels of dialogues in a video game is provided in accordance with claim 1.

In another aspect, an information processing apparatus is provided in accordance with claim 11.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A video game system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Embodiments of the present description are applicable to a video game system involving a video game console, a development kit for such a system, or a video game system using dedicated hardware or a computer and suitable controllers. In the present application terms such as 'user' and 'player', 'dialogue' and 'narrative' may be used interchangeably except where indicated otherwise.

Figure 1:
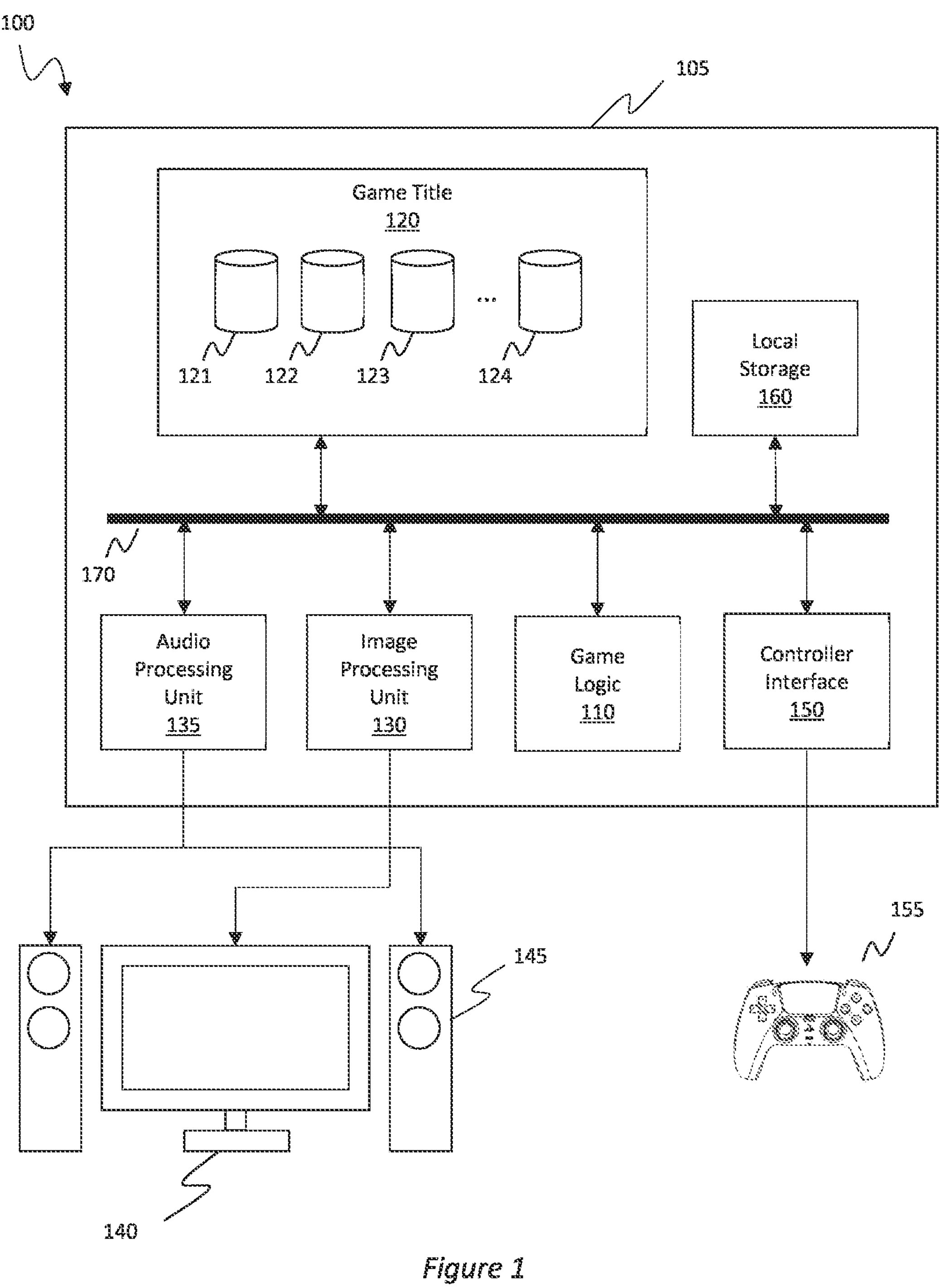
FIG. 1 is a schematic diagram of a video game system in accordance with embodiments of the present application.

For the purposes of explanation and referring now to the drawings, wherein like reference numerals designate identical or corresponding parts throughout the several views, FIG. 1 illustrates a schematic diagram of a video game system 100 in accordance with embodiments of the present application. The video game system 100 may comprise a game console 105, a display device 140, a speaker system 145, and a game controller 155. In some cases such as for example portable game consoles, the display device, speaker system and controller may be integral to the video game system.

According to embodiments of the present application, the video game system 100 provides a graphical user interface which allows the user to adjust the game dialogue complexity during a conversation with game characters or a presentation of a narrative. In this case, the game console 105, such as a PlayStation®, access the game title database 120 which contains multiple versions of dialogue text 121-123 of different complexity level, and multiple voice recordings corresponding to different versions of dialogue text. For example, the game title may contain: the full dialogues 121 which is based on the original game script; the simple dialogues 122 which include all the information of the full dialogue but is shorter and, for instance, uses simpler language; and the summary dialogues 123 which include only the key points of the full dialogue necessary for the critical path(s) of the game. According to embodiments of the present application, when the user is presented with a dialogue during the game, it could be initially the full dialogue. In the event that the user feels the need to reduce the complexity of the dialogue, they may follow the instructions displayed on the graphical user interface and operate the game controller 155 accordingly. For instance, they may press a designated button on the game controller 155 to change the full dialogue to the simple dialogue. Upon a further press of the designated button on the game controller 155, the simple dialogue can be changed to the summary dialogue. Similarly, the user may enhance the complexity of the dialogue by pressing another designated button on the game controller 155 to reverse this progression. Although FIG. 1 shows only three complexity levels of dialogues, one can generalise from three complexity levels to a plurality which is usually limited by the storage of the game title and complexity of user operation.

Referring to the video game system 100 in FIG. 1, the game console 105 comprises a game logic 110, a game title database 120, an image processing unit 130, an audio processing unit 135, a game controller interface 150, and a local storage 160. The components of the game console 105 are connected via a bus 170.

The game logic 110 executes game code loaded from the game content storage 124 of the game title database 120, in order to generate the game environment which interacts with the player character. The game logic 110 may also load user save data and user settings stored in local storage 160. The user may control the player character by operating the game controller 155, and the game logic 110 processes the input signals received from the game controllers via the game controller interface 150.

The image processing unit 130 renders 2D or 3D computer graphics for the game environment generated by the game logic 110. During for example a conversation with game characters, the image processing unit 130 may overlay a dialogue window or a dialogue bubble on top of the graphics of the game environment. Dialogue or narrative text is loaded from the dialogue databases 121-123 according to the parameter associated with dialogue complexity level in user settings. The image processing unit 130 then generates video signals for the game graphics and transmits the video signals to the display device 140.

Additionally, the audio processing unit 135 retrieves voice files from the game title database 120 corresponding to the dialogue or narrative, then decompresses and decodes the voice files into audio signals for playback at the speaker system 145. Further details of the video game console 105 will be described with reference to FIG. 2.

According to embodiments of the present application, the image processing unit 130 may display instructions on the dialogue window for the user to modify the dialogue complexity level in user settings through an operation performed on the game controller 155. The game controller 155 generates input signals resulting from the user operation and the game console 105 receives the input signals at the controller interface 150. The game logic 110 then processes the input signals and updates the parameter associated with the dialogue complexity level in user settings. Subsequent dialogues and voice files will be loaded from the game title database 120 based on the updated parameter.

Figure 2:
FIG. 2 is a schematic diagram of an entertainment device in accordance with embodiments of the present application.
Figure 2:
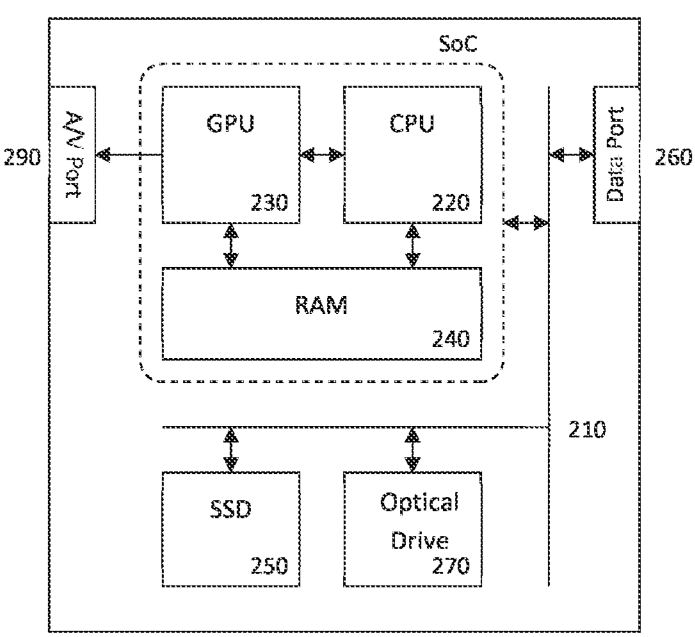

FIG. 2 illustrates a schematic diagram of an entertainment device in accordance with embodiments of the present application. The entertainment device comprises a central processor 220. This may be a single or multi core processor, for example comprising eight cores as in the PlayStation 5 ® ('PS5'). The entertainment device also comprises a graphical processing unit or GPU 230. The GPU can be physically separate to the CPU, or integrated with the CPU as a system on a chip (SoC) as in the PS5.

The entertainment device also comprises RAM 240, and may either have separate RAM for each of the CPU and GPU, or shared RAM as in the PS5. The or each RAM can be physically separate, or integrated as part of an SoC as in the PS5. Further storage is provided by a disk 250, either as an external or internal hard drive, or as an external solid state drive, or an internal solid state drive as in the PS5.

The entertainment device may transmit or receive data via one or more data ports 260, such as a USB port, Ethernet® port, WiFi® port, Bluetooth® port or similar, as appropriate. It may also optionally receive data via an optical drive 270.

Interaction with the system is typically provided using one or more handheld controllers 280, such as the DualSense® controller in the case of the PS5.

Audio/visual outputs from the entertainment device are typically provided through one or more A/V ports 290, or through one or more of the wired or wireless data ports 260.

Where components are not integrated, they may be connected as appropriate either by a dedicated data link or via a bus 210.

Such an entertainment device may be used as a game console 105 in a video game system 100 to generate a graphical user interface for controlling the complexity level of dialogues. It will be appreciated that this is a non-limiting example and that as noted previously herein other examples of a game console may include a phone or smart television.

Figure 3:
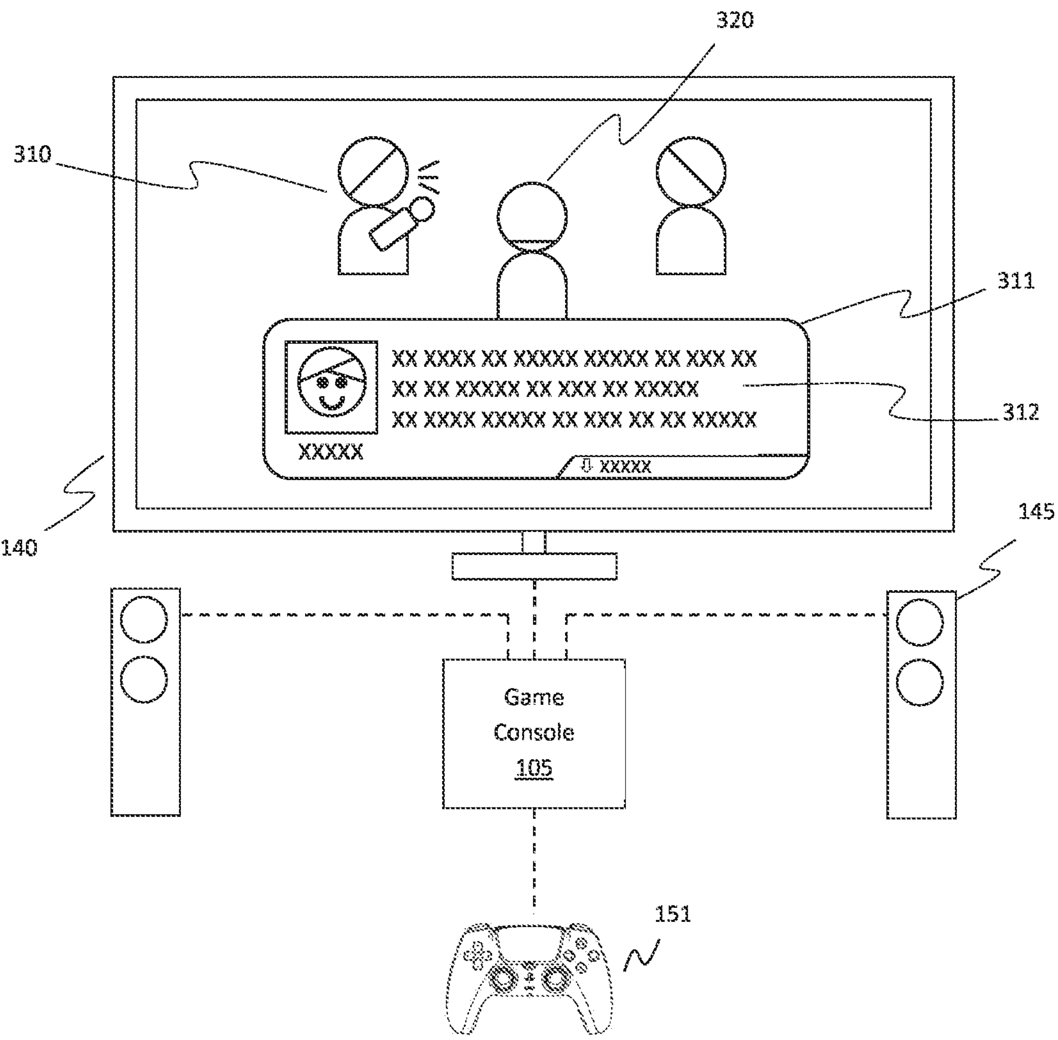
FIG. 3 is an example scenario of controlling the complexity level of dialogues in a video game by a video game system in accordance with embodiments of the present application.

FIG. 3 illustrates an example scenario of controlling the complexity level of dialogues in a video game by a video game system in accordance with embodiments of the present application. The example scenario describes a video game environment in which the player character 320 encounters certain game events, such as engaging with a non-playable character (NPC), interacting with a game item, or change of character status, and causes the display of a narrative or enters a conversation with a non-playable character 310. The game console 105 generates a graphical user interface containing a dialogue window 311. The dialogue window 311 displays the dialogue text 312 according to a parameter in the user settings defining the dialogue complexity level. In some embodiments, the parameter may be set at the highest dialogue complexity level by default. The game console 105 further retrieves audio files corresponding to the dialogue text 312 and transmits audio signals to the speaker system 145 for playing back the speech.

According to embodiments of the present application, the dialogue window 311 further displays an instruction 313 for the player to adjust the dialogue complexity level without quitting the conversation or pausing the gameplay. In some embodiments, the instructions may be related to pressing a button on the game controller 151 or entering a combination of buttons on the game controller.

After receiving the instructions from the game controller 151 to modify the dialogue complexity level, the game console 105 will update the parameter associated with dialogue complexity in the user settings and load the next dialogue according to updated dialogue complexity. The 'next dialogue' may either be a different complexity version of the same dialogue (i.e. functioning to replace and update the current dialogue in response to the user input), or the next subsequent dialogue, when this is needed, at the updated dialogue complexity. The graphical user interface for controlling the dialogue complexity level will be described in more detail with reference to FIGS. 4 and 5.

Figure 4:
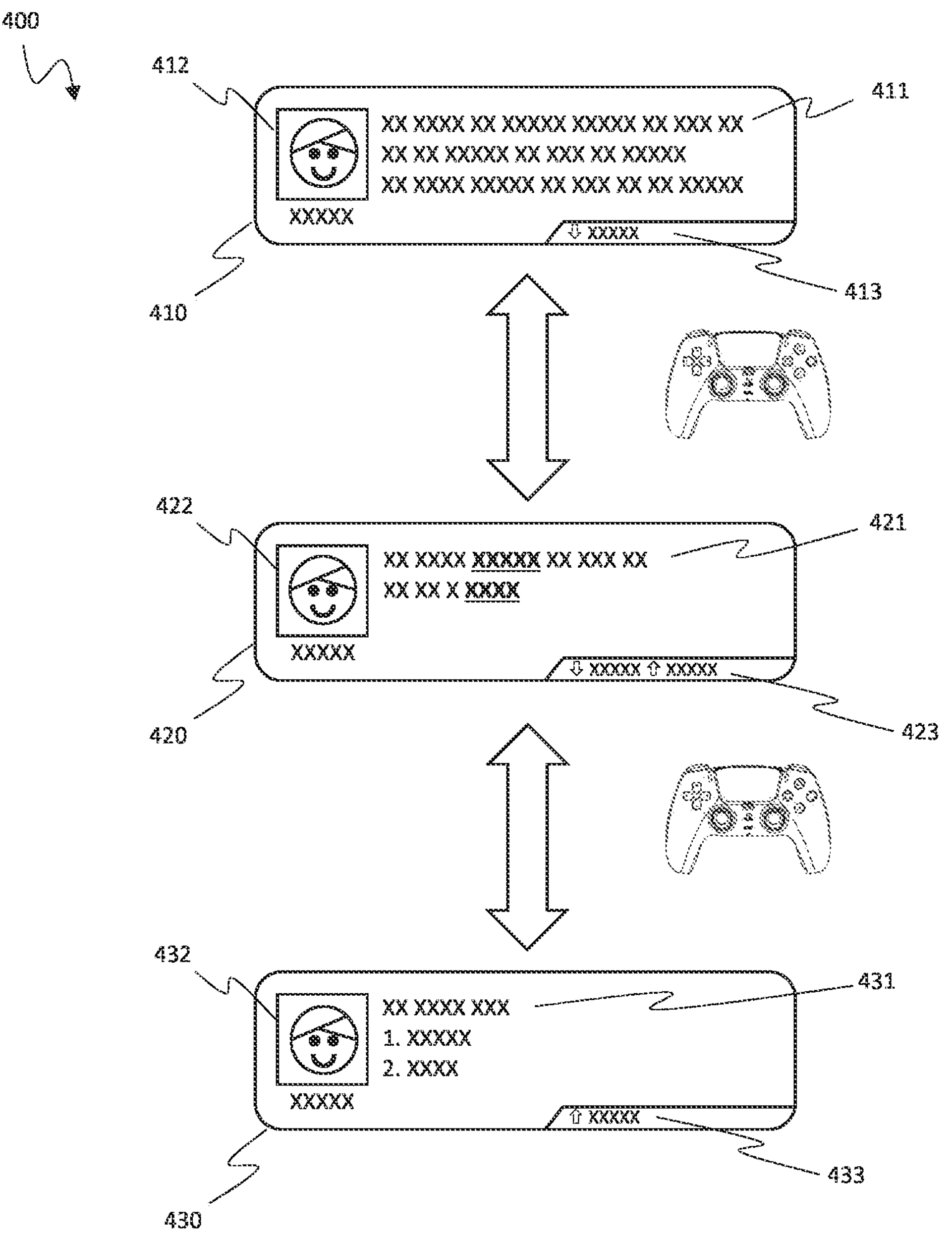
FIG. 4 is a graphical user interface for controlling the complexity level of dialogues in a video game in accordance with embodiments of the present application.

FIG. 4 illustrates a graphical user interface 400 for directly controlling the complexity level of dialogues in a video game in accordance with embodiments of the present application. The graphical user interface 400 comprises a full dialogue window 410 for displaying a full dialogue text 411 and an instruction 413 to the player for lowering the complexity level of the character dialogue. For instance, the instruction may be represented by an icon or a series of icons indicating the operation (e.g.: pressing a button or a combination of buttons) to be performed on the game controllers in order to lower the dialogue complexity. The full dialogue window 410 may further display a portrait 412 of the game character who is presenting the full dialogue text 411. Optionally or additionally, the graphical user interface 400 may indicate to the player the current level of dialogue complexity, for example, by the colour of the background of the full dialogue window 410. Upon receiving the player's instruction to lower the dialogue complexity level, the graphical user interface 400 changes the full dialogue window 410 to a simple dialogue window 420.

The full dialogue text 411 may be the complete version of the narratives and dialogues, containing extensive texts to provide the player with both important and optional information in regards to all branches of the game lore, and instructions for advancing the critical game path as well as the optional game paths and side quests as required. To enhance player experience and increase player immersion, the full dialogue text 411 may be written in colloquial language and with expressions that present a more natural conversation reflecting the personalities of the game characters and the context of the situation, and information may be provided indirectly for example in the form of jokes and riddles. The full dialogue text 411 may also contain discoverable and collectible dialogues which allow the players to discover additional story branches and collectible game items in order to add depth to the game world.

According to embodiments of the present application, the simple dialogue window 420 displays a simple dialogue text 421 and instructions 423 to the player for enhancing or lowering the complexity level of the character dialogue. For instance, the instruction may be represented by an icon or a series of icons indicating the operation (e.g.: pressing a button or a combination of buttons) to be performed on the game controllers in order to change the dialogue complexity. The simple dialogue window 420 may further display a portrait 422 of the game character who is presenting the simple dialogue text 421. Optionally or additionally, the graphical user interface 400 may indicate to the player the current level of dialogue complexity, for example, by the colour of the background of the simple dialogue window 420. Depending on the player's instruction of changing the dialogue complexity level, the graphical user interface 400 may switch the simple dialogue window 420 back to the full dialogue window 410 or to the summary dialogue window 430, which will be described in detail below.

Comparing to the full dialogue text 411, the simple dialogue text 421 may still cover all game paths and all branches of the story as required. However, the simple dialogue text 421 is written in simple language to give clear and direct instructions for the players to advance the game.

The key information in the simple dialogue text 421 may also be highlighted (as shown in bold and underline in simple dialogue window 420) to help the player identify all the clues in the dialogues.

According to embodiments of the present application, the summary dialogue window 430 displays a summary dialogue text 431 and instructions 433 to the player for enhancing the complexity level of the character dialogue. For instance, the instruction may be represented by an icon or a series of icons indicating the operation (e.g.: pressing a button or a combination of buttons) to be performed on the game controllers in order to enhance the dialogue complexity. The simple dialogue window 430 may further display a portrait 432 of the game character who is presenting the summary dialogue text 431. Optionally or additionally, the graphical user interface 400 may indicate to the player the current level of dialogue complexity, for example, by the colour of the background of the simple dialogue window 430. Upon receiving the player's instruction to enhance the dialogue complexity level, the graphical user interface 400 changes the summary dialogue window 430 to the simple dialogue window 420.

Comparing to the full dialogue text 411 and simple dialogue text 421, the summary dialogue text 431 may only involve the critical game path and main storyline (or the current path/storyline), and exclude the optional game paths and side quests. Further, only the necessary information for advancing the game is provided by the summary dialogue text 431 and the information may be presented in bullet points for easy understanding of the player. In some cases, pure information may be given directly to the player to avoid misunderstanding.

Hence in summary, successive levels of dialogue successively remove or simplify extraneous dialog content, and retain or simplify dialog content essential to the current game path or quest, for a given piece of dialog. Successive levels may optionally also alter the layout and/or appearance of the displayed dialog to simplify assimilation. Successive levels therefore typically result in the removal or reduction of colloquial language and phrasing, and the increased use of simpler words and phrasing. It may typically also result in the removal of references to elements of the game other than those relevant to the current game path or quest. It is possible that as a result, a particular piece of dialog becomes empty at one or more levels, and if so may revert to acting like a dialog skip action.

The game dialogue system according to embodiments of the present application provides a more flexible user interface for delivering information to the player. By providing simple button operations for the player to adjust the dialogue complexity level directly via the game controller during a conversation with game characters in the game, while not missing any important information for the gameplay. The complexity level of the dialogues or narratives can be changed conveniently and dynamically to facilitate the user interaction, and to deliver information in an effective and enjoyable manner, thereby enhancing gaming experience.

Figure 5:
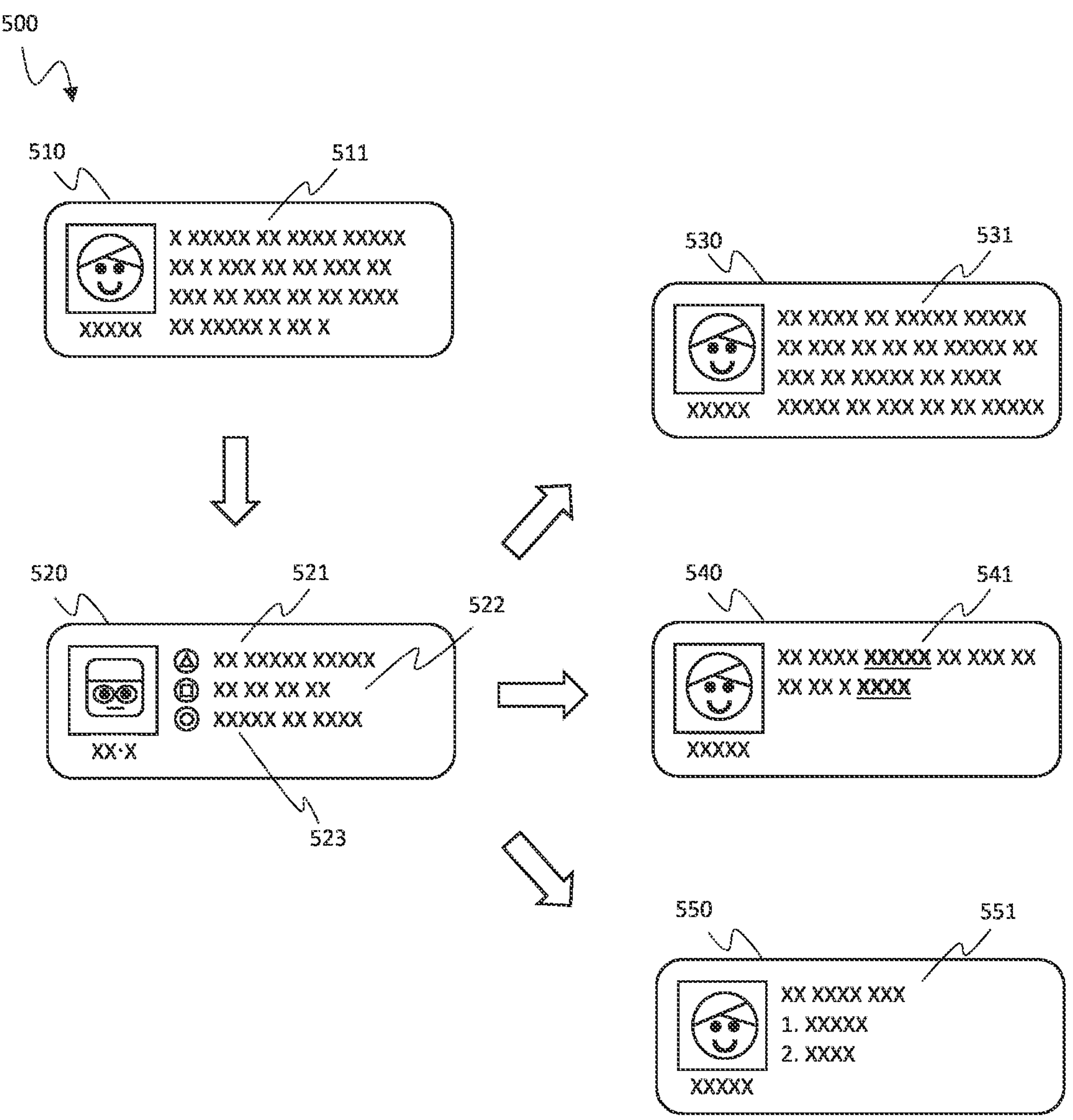
FIG. 5 is another graphical user interface for controlling the complexity level of dialogues in a video game in accordance with embodiments of the present application.

FIG. 5 shows a graphical user interface 500 for indirectly controlling the complexity level of dialogues in a video game in accordance with embodiments of the present application. Instead of providing explicit instructions to the player for changing the dialogue complexity level, such as icons representing button press as explained above with reference to FIG. 4, the graphical user interface 500 provides a game character dialogue window 510 which displays a dialogue or narrative 510 to the player and prompts for feedback from the player character. The graphical user interface 500 then proceeds to display a player character dialogue window 520, which shows the available feedback dialogues 521, 522 from which the player may select to respond to the dialogue 510 displayed in the dialogue window 510. The feedback dialogue 521 may include dialogue text which implies the player's preference to lower the dialogue complexity level for future dialogues. For instance, feedback dialogue 521 may contain dialogue text: "I'm eager to learn more about the mission" to allow the player to get more detailed information and in the meantime increase the level of dialogue complexity for future dialogues.

The player character dialogue window 520 may additionally allow the player to select feedback dialogue 522, which implies the player's preference to lower the dialogue complexity level. For example, feedback dialogue 522 may contain dialogue text: "we need to act now. Let's not get hung up on the details" or "I should be going now", to allow the player to cut short the present conversation with the game character and in the meantime reduce the level of dialogue complexity for future dialogues.

Optionally or additionally, the player character dialogue window 520 may provide choices of feedback actions for responding to the dialogue or narrative 510, such as performing a gesture or giving a facial expression, which imply the player's preference to enhance or lower the dialogue complexity level.

Based on the feedback dialogue or feedback action selected by the player in the player character dialogue window 520, the graphical user interface 500 will proceed to display a full dialogue window 530, a simple dialogue window 540, or a summary dialogue window 550, respectively presenting a full dialogue text 531, a simple dialogue text 541, and a summary dialogue text 551 similar to the full dialogue text 411, simple dialogue text 421, and summary dialogue text 431 as previously described with reference to FIG. 4. Furthermore, the game logic 110 may dynamically modify the parameter in the local database defining the dialogue complexity level according to the feedback dialogue selected by the player in the player character dialogue window 520. As the conversation with the game character continues, the graphical user interface 500 may display additional dialogue windows allowing the player to select feedback which may further modify the dialogue complexity level.

The game dialogue system of according to embodiments of the present application provides a game dialogue system which automatically adjusts the dialogue complexity level based on feedback dialogue selected by the player. A more natural process for adjusting the dialogue complexity level without interruption to the gameplay can therefore be achieved.

Figure 6:
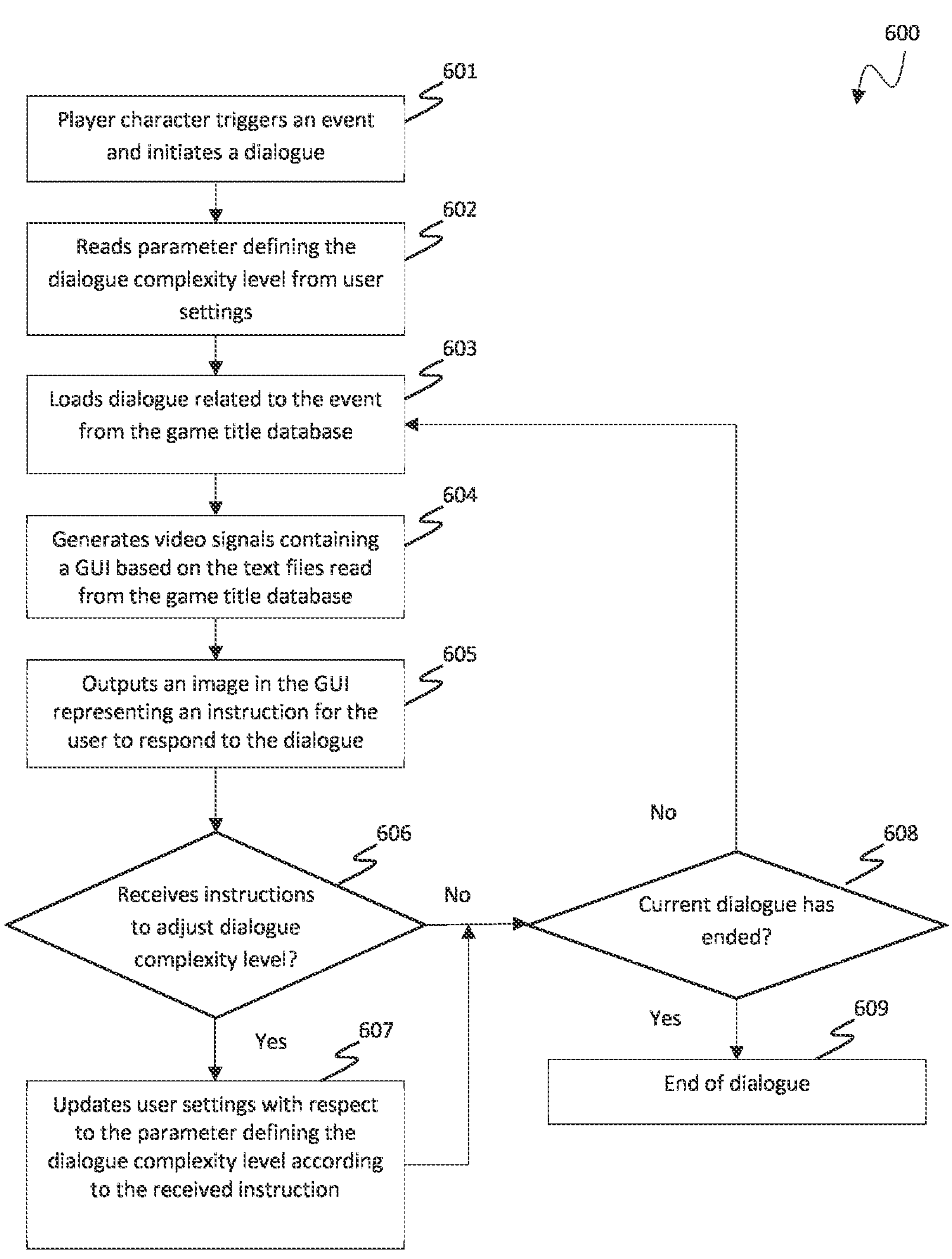
FIG. 6 is a flow diagram of a method of controlling the complexity level of dialogues in a video game in accordance with embodiments of the present application.

FIG. 6 shows a flow diagram describing a computerized process 600 of controlling the complexity level of dialogues in a video game in accordance with embodiments of the present application. Process 600 may begin at step 601, where the player character triggers an event and initiates the output of a dialogue. For example, when the player character gains enough experience to reach a new level, the game logic 110 may output a dialogue to prompt the player to select a new class for the player character. In another example, the player character may have engaged with an NPC and start a conversation, in which case the dialogue may comprise a dialogue with the NPC.

At step 602, the game logic 110 reads a parameter defining the dialogue complexity level from user settings, which may be stored in the local storage 160. Alternatively, the user settings containing the parameter which defines the dialogue complexity level may be stored in a network storage, such as in the cloud.

At step 603, the game logic 110 loads a narrative or dialogue related to the event from the game title database 120 according to the dialogue complexity level. For instances, the narrative or dialogue may be audio speeches and speech subtitles stored in dialogue databases 121-123 in the form of text files and audio files. In some embodiments, each of the dialogue databases 121-123 may be allocated to a designated dialogue complexity level and the relevant dialogue database will be assessed according to the parameter defining the dialogue complexity level.

At step 604, the image processing unit 130 generates video signals containing a graphical user interface based on the text files read from the dialogue databases 121-123 such that the narrative or speech subtitles are presented in the display device 140. Additionally, the audio processing unit 140 generates audio speech corresponding to the narrative or speech subtitles based on the audio files read from the dialogue databases 121-123. The audio speech may then be output to a speaker system 145. Optionally and additionally, the image processing unit 130 may modify the game characters to show emotions such as facial expressions or gestures that corresponds to the context of the narrative or the dialogue.

At step 605, the image processing unit 130 outputs an image in the graphical user interface representing an instruction for the user to respond to the narrative or speech. The instruction to respond to the narrative or speech may include selecting a reaction to be performed by the player character. Alternatively, the image processing unit 130 outputs an image in the graphical user interface representing an instruction for the user to adjust the dialogue complexity level. For example, the instruction may indicate the designated button or combination of buttons to be entered by the user to increase or decrease the dialogue complexity level.

The process then moves to step 606 where the game logic 110 receives an instruction from the user via a game controller 155. In the event that the received instruction relates to adjusting the dialogue complexity level, the process moves to step 607 where the game logic 110 updates the user settings with respect to the parameter defining the dialogue complexity level according to the received instruction. For example, the user may have entered the designated button or combination of buttons as indicated by the graphical user interface to change the dialogue complexity level. Alternatively, the user may have selected a reaction performed by the player character, such as a speech response, which corresponds to a change of the dialogue complexity level.

The process then moves to step 608 where the game logic 110 determines whether all lines of the current narrative or dialogue has been played. In the event that the narrative or dialogue has not finished, the process then moves to step 603 where the game logic 110 loads the next line of narrative or dialogue related to the event from the game title database 120 according to the adjusted dialogue complexity level. In some embodiments, the dialogue of a game character may be a turn-based dialogue, upon adjusting the parameter related to dialogue complexity level, the game logic 110 loads the dialogue for the next turn in the turn-based dialogue according to the adjusted parameter. The image processing unit 130 and audio processing unit 135 then output the dialogue for the next turn without restarting the whole dialogue.

Returning to step 608, in the event that all lines of the current narrative or dialogue has been played, the process then moves to step 609 to end the narrative or dialogue.

Returning to step 606, in the event that no instruction related to adjusting the dialogue complexity level is received, the process moves to step 608. In step 608, as described above, the game logic 110 determines whether the current narrative or dialogue has ended. In the event that the narrative or dialogue has not finished, the process then moves to step 603 where the game logic 110 loads the next line of narrative or dialogue from the game title database 120 according to the unchanged dialogue complexity level.

Figure 7:
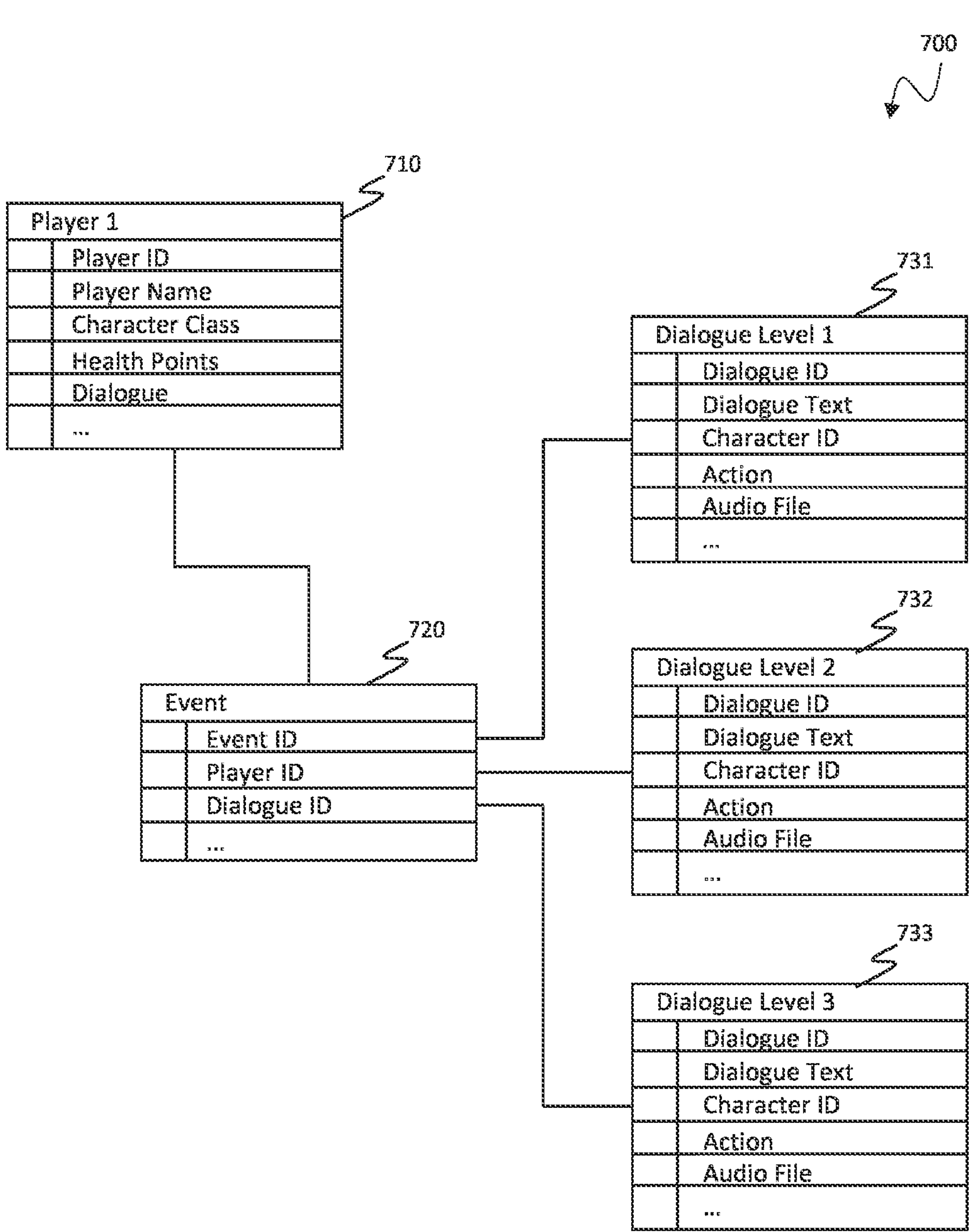
FIG. 7 is an example relational database of a video game system in accordance with embodiments of the present application.

FIG. 7 illustrates a data structure which is, in embodiments, a database 700 of a video game system in accordance with embodiments of the present application. The database 700 is shown as a relational database consisting of multiple database tables (a player database table 710, an event database table 720, and multiple dialogue database tables 731-733 associated with various complexity levels), but the disclosure is not so limited and other database models may be implemented. Moreover, although FIG. 7 shows only three dialogue complexity levels, any number of dialogue complexity levels is envisaged and the number of dialogue database tables may be changed accordingly.

Referring to the player database table 710, a number of parameters associated with a player may be stored. In particular, one or more of the player ID, player character name, player character status, and dialogue complexity level may be stored in correspondence with the player. In the case of a multiplayer game, parameters associated with different players may be stored in separate player database tables.

The parameters associated with game events may be stored in the event database table 720. Specifically, the event database table 720 may store an event ID for identifying the game event, a character ID defining the character involved in the game event, and a dialogue ID linking to the dialogue triggered by the game event.

According to embodiments of the present application, the game narratives and dialogues are written in three versions with respect to different dialogue complexity levels, namely, summary dialogues, simple dialogues, full dialogues, which are respectively stored in level 1, level 2 and level 3 dialogue database tables 731-733.

According to embodiments of the present application, level 3 dialogue database table 733 stores the full dialogues which are the complete version of the narratives and dialogues, containing extensive texts to provide the player with both important and optional information in regards to all branches of the game lore, and instructions for advancing the critical game path as well as the optional game paths and side quests. To enhance player experience and increase player immersion, the full dialogues may be written in colloquial language and expressions to present the personalities of the game characters and the context of the situation, and information may be provided indirectly in the form of jokes and riddles. The full dialogues may also contain discoverable and collectible dialogues which allow the players to discover additional story branches and collectible game items in order to add depth to the game world.

According to embodiments of the present application, level 2 dialogue database table 732 stores the simple dialogues which may still cover all game paths and all branches of the story. However, the dialogues are written in simple language to give clear and direct instructions/information for the players to advance the game. The key information in the simple dialogues may also be highlighted to help the player identify all the clues in the dialogues.

According to embodiments of the present application, level 1 dialogue database table 731 stores the summary dialogues which may only involve the critical game path and main storyline, or only information critical to all game paths and story branches, or optionally exclude the optional game paths and side quests or simplify their dialogue still further. Hence typically only the necessary information for advancing the game is provided the summary dialogues and the information may for example use bullet points for easy understanding by the player.

Each of the dialogue database tables 731-733 may store a dialogue ID in correspondence with the dialogue text. Different complexity versions of dialogue text corresponding to the same context may be assigned with the same dialogue ID. For example, the same dialogue ID may be assigned to the dialogues prompting the player to select a class for the player character, the game logic 110 may first select the dialogue database table of preferred complexity level based on the parameter associated with the dialogue complexity level stored in the player database table 710. The game logic 110 may subsequently retrieve the dialogue texts and audio files from the selected dialogue database table according to the dialogue ID.

Each of the dialogue database tables 731-733 may further store the character ID of the game characters presenting the relevant dialogues. In the event that the dialogue text is a narrative, the character ID may be set as a dummy value. The dialogue database tables 731-733 may additionally store the name and location of the audio file corresponding to the dialogue text. The game logic 110 may then retrieve the audio files from the game title database 120 and playback the speeches in the speaker system 145. Optionally and additionally, the dialogue database tables 731-733 may store the parameters associated with the actions or emotions performed by the game characters during the course of presenting the relevant dialogues. The game logic 110 and image processing unit 130 may then control the game characters to express the emotions or perform the actions in the game environment in accordance with these action parameters retrieved from the dialogue database tables 731-733.

According to embodiments of the present application, when the dialogue complexity is set at a high level, such as in the full dialogue mode, the game logic 110 may enable randomness of dialogues to provide a more natural conversation with the game character, especially when the conversation is being repeated. In this regard, multiple dialogues of the same context but different expressions are stored in the dialogue database tables 731-733, and the game logic randomly selects from the multiple dialogues to be presented by the game character.

Variations in the systems, methods and techniques herein may also be contemplated. For example, rather than use dialogue windows as described elsewhere herein, dialogue and narrative text may take the form of subtitles directly superposed on the displayed content.

With regards to a predetermined button (whether physical on a controller and/or virtual on an on screen user interface element) for reducing the dialogue complexity level, as noted elsewhere herein the user may press the button to shift down to a simpler level. However, the user may nevertheless still want to skip the dialog entirely. Hence optionally if the user presses and holds such a button for a predetermined length of time (i.e. a 'long press' rather than a 'short press') then the system skips the dialog entirely instead of shifting level. Similarly, optionally if the dialog is at the simplest level, the user may press the simplify dialog button to skip out of the simplest dialog version. In this case, similarly if in a more complex version of the dialogue optionally the user may press the simplify dialog button several times, indicating a wish to skip down and then out of the dialogue, without the need for the device to actually switch to any of the intermediate dialogue versions before skipping the dialogue.

Regarding shifting to a different complexity level of dialogue, when the user presses the button the system may start the new audio dialogue having the new complexity from the beginning, or optionally may start the new audio dialogue from an equivalent proportion of the way through or at the closest spoken critical word or phrase, to reduce repetition. Alternatively, optionally the system may only change the complexity level of dialogue for the next dialogue.

It is relatively common for users to encounter some non-player characters or situations many times during a game, and to prompt the same dialogue or narrative description many times, whether intentionally or not. Hence optionally, the system may be configured so that when some or all such dialogue is repeated, the repeats are at successively simpler levels of dialog, so that the repeat become shorter and more succinct. This shift may occur after every repetition of a dialogue, or every 2, 3, . . . N repetitions. Optionally or additionally, in the event when a simpler level of dialog is loaded during a repeated conversation, the parameter associated with the dialogue complexity level in user settings will not be modified so that future dialogues will be loaded at a consistent complexity level irrespective of the occurrence of the repeated conversation.

Different users may have different needs for example in terms of assimilating written information, or in becoming frustrated with the delay inherent in spoken dialogue or description. Hence optionally the techniques herein may decouple the written and audio dialogue complexities. Hence for example a user may press a button to simplify the audio dialogue whilst maintaining the full written dialogue, so that they can quickly read the full information whilst the audio is much shorter (but still optionally conveys the personality or emotional component of the dialogue). Conversely, another person may wish to retain the full audio dialogue, and receive a simpler written version to read, for example with the option to then skip the rest of the audio dialogue if they feel the written version has provided them with what they need.

This latter approach may also be simpler for a game developer to implement; rather than having to record multiple versions of the audio dialogue, merely different versions of the accompanying text may be prepared.

In either case such an approach may also be combined for example with the scheme to simplify repeats, for example keeping the written dialogue more complex than the spoken repeat.

The levels of dialogue may be tailored to specific needs, for example targeting different effective reading ages, or selecting words that may assist a reader with dyslexia.

It will be appreciated that the dialogue complexity level established during one session is typically saved (whether in association with the game, the user profile, or both, either locally or at a remote server), and dialogue in one or more subsequent sessions is then played with this saved dialogue complexity level.

It will be appreciated that the above methods may be carried out on conventional hardware suitably adapted as applicable by software instruction (e.g. game console 200) or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Hence in a summary embodiment of the present description, an information processing apparatus comprises the following.

Firstly, a game execution module (e.g.: game logic 110) is configured (for example by suitable software instruction) to load a first dialogue from a game database according to a parameter related to complexity level of dialogue in user settings, as described elsewhere herein.

Secondly, an image processing module (e.g.: image processing unit 130) is configured (for example by suitable software instruction) to output the first dialogue and optionally an image representing an instruction for the user to respond to the first dialogue, as described elsewhere herein.

Thirdly, an input circuitry (e.g.: game controllers 155) is configured (for example by suitable software instruction) to receive a user operation of in response to the first dialogue, as described elsewhere herein. In particular, the game execution module is configured to adjust the parameter related to complexity level of dialogues in user settings based on the user operation, and load a second dialogue from the game database according to the adjusted parameter related to complexity level of dialogue, and the image processing module outputs the second dialogue.

It will be apparent to a person skilled in the art that variations in the above system corresponding to the various embodiments of the method as described and claimed herein are considered within the scope of the present invention, including but not limited to that:

- In an instance of the summary embodiment, the second dialogue is a version of the first dialogue with a different complexity level, as described elsewhere herein;
- In an instance of the summary embodiment, the first dialogue and second dialogue comprise a narrative of the video game, as described elsewhere herein;
- In an instance of the summary embodiment, the dialogue of a game character is a turn-based dialogue, the method comprises the step of: upon adjusting the parameter related to complexity levels of dialogues, loading the second dialogue for the next turn according to the adjusted parameter related to complexity levels of dialogue, without restarting the dialogue, as described elsewhere herein;
- In an instance of the summary embodiment, the instruction for the user to respond to the first dialogue corresponds to either increasing or decreasing the complexity level of dialogue, as described elsewhere herein;
- In an instance of the summary embodiment, the instruction for the user to respond to the first dialogue is related to an input from a game controller, as described elsewhere herein;

In an instance of the summary embodiment, the instruction for the user to respond to the first dialogue is related to a game character interaction selected by the user, as described elsewhere herein;

In an instance of the summary embodiment, the complexity level of dialogues is: full dialogues, simple dialogues, or summary dialogues, as described elsewhere herein;

In an instance of the summary embodiment, the method comprises the step of enabling randomness of dialogue when the complexity level of dialogues is full dialogues, as described elsewhere herein;

In an instance of the summary embodiment, if a dialogue is repeated, it is repeated with a lower level of complexity, as described elsewhere herein; and In an instance of the summary embodiment, the dialogue is represented by both audio and written text, and the change of complexity of dialogue is only applied to one of these, as described elsewhere herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A method of controlling the complexity level of dialogues in a video game, comprising the steps of: loading a first dialogue from a game database according to a parameter related to complexity level of dialogue in user settings; outputting the first dialogue; accepting a user operation in response to the first dialogue; adjusting the parameter related to complexity level of dialogues in user settings based on the user operation; loading a second dialogue from the game database according to the adjusted parameter related to complexity level of dialogue; and outputting the second dialogue.

2. The method of controlling the complexity level of dialogues in a video game according to clause 1, wherein the second dialogue is a version of the first dialogue with a different complexity level.

3. The method of controlling the complexity level of dialogues in a video game according to clause 1 or clause 2, wherein the first dialogue and second dialogue comprise a narrative of the video game.

4. The method of controlling the complexity level of dialogues in a video game according to clause 1, wherein the dialogue of a game character is a turn-based dialogue, the method further comprising the step of: upon adjusting the parameter related to complexity level of dialogues, loading the second dialogue for the next turn according to the adjusted parameter related to complexity levels of dialogue, without restarting the dialogue.

5. The method of controlling the complexity level of dialogues in a video game according to clause 1, wherein an instruction for the user to respond to the first dialogue corresponds to either increasing or decreasing the complexity level of dialogue.

6. The method of controlling the complexity level of dialogues in a video game according to clause 5, wherein the instruction for the user to respond to the first dialogue is related to one or more selected from the list consisting of: i. an operation of the game controller; and ii. a game character interaction selected by the user.

7. The method of controlling the complexity level of dialogues in a video game according to any preceding clause, wherein the complexity level of dialogues is: full dialogues, simple dialogues, or summary dialogues.

8. The method of controlling the complexity level of dialogues in a video game according to any preceding clause, wherein if a dialogue is repeated, it is repeated with a lower level of complexity.

9. The method of controlling the complexity level of dialogues in a video game according to any preceding clause, wherein the dialogue is represented by both audio and written text, and the change of complexity of dialogue is only applied to one of these.

10. A computer program comprising computer executable instructions adapted to cause a computer system to perform the method of any one of the preceding clauses.

11. An information processing apparatus, comprising: game logic circuitry to load a first dialogue from a game database according to a parameter related to complexity level of dialogue in user settings; image processing circuitry to output the first dialogue; and input circuitry to receive a user operation in response to the first dialogue, wherein the game logic circuitry adjusts the parameter related to complexity level of dialogues in user settings based on the user operation; wherein the game logic circuitry loads a second dialogue from the game database according to the adjusted parameter related to complexity level of dialogue; and and wherein the image processing circuitry outputs the second dialogue.

12. The information processing apparatus according to clause 11, wherein the dialogue of a game character is a turn-based dialogue; wherein the game logic circuitry, upon adjusting the parameter related to complexity levels of dialogues, loads the second dialogue for the next turn according to the adjusted parameter related to complexity levels of dialogue, without restarting the dialogue.

13. The information processing apparatus according to clause 11, wherein the instruction for the user to respond to the first dialogue corresponds to either increasing or decreasing the complexity level of dialogue.

14. The information processing apparatus according to clause 13, wherein the instruction for the user to respond to the first dialogue is related to an input from a game controller.

15. The information processing apparatus according to clause 13, wherein the instruction for the user to respond to the first dialogue is related to a game character interaction selected by the user.

The invention claimed is:

1. A computer-implemented method comprising:

loading a first dialog from a game database according to a dialog complexity parameter configured in user settings, the first dialog comprising a first video game narrative having a first complexity level;

outputting the first dialog;

receiving a user input associated with the first dialog, wherein the user input comprises a press of a button of a game controller;

adjusting the dialog complexity parameter in the user settings based on the user input;

increasing or decreasing a complexity level of a second dialog from the game database according to the adjusted dialog complexity parameter;

loading the second dialog, the second dialog comprising a second video game narrative having a second complexity level that differs from the first complexity level of the first video game narrative; and outputting the second dialog, wherein a short press of the button reduces the dialog complexity parameter, and wherein a long press of the button skips the second dialog entirely.

2. The method of claim 1, wherein the second dialog is a version of the first dialog with a different complexity level.

3. The method of claim 1, wherein the first dialog comprises a first turn of a turn-based dialog of a game character and the second dialog comprises a subsequent turn of the turn-based dialog of the game character.

4. The method of claim 3, further comprising:

after adjusting the dialog complexity parameter, loading the subsequent turn of the turn-based dialog according to the adjusted dialog complexity parameter without restarting the turn-based dialog.

5. The method of claim 1, wherein outputting the second dialog comprises outputting at least one of a full dialog, a simple dialog, or a summary dialog corresponding to the second video game narrative.

6. The method of claim 1, wherein outputting the second dialog comprises repeating the first dialog with a lower level of complexity.

7. The method of claim 1, wherein the second dialog comprises both audio and written text, and wherein adjusting the dialog complexity parameter causes a change in complexity of either the audio or the written text.

8. The method of claim 1, wherein outputting the second dialog comprises outputting the second video game narrative as a bulleted list with bold or underlined text.

9. The method of claim 1, further comprising:

outputting a plurality of selectable character responses, wherein the user input corresponds to one of the selectable character responses.

10. A non-transitory computer-readable medium storing instructions that, when executed by one or more processors, cause the one or more processors to perform operations comprising:

loading a first dialog from a game database according to a dialog complexity parameter configured in user settings, the first dialog comprising a first video game narrative having a first complexity level;

outputting the first dialog;

receiving a user input associated with the first dialog, wherein the user input comprises a press of a button of a game controller;

adjusting the dialog complexity parameter of a second dialog in the user settings based on the user input;

increasing or decreasing a complexity level of the second dialog according to the adjusted dialog complexity parameter;

loading the second dialog, the second dialog comprising a second video game narrative having a second complexity level that differs from the first complexity level of the first video game narrative; and outputting the second dialog, wherein a short press of the button reduces the dialog complexity parameter, and wherein a long press of the button skips the second dialog entirely.

11. The non-transitory computer-readable medium of claim 10, wherein the second dialog is a version of the first dialog with a different complexity level.

12. The non-transitory computer-readable medium of claim 10, wherein the first dialog comprises a first turn of a turn-based dialog of a game character and the second dialog comprises a subsequent turn of the turn-based dialog of the game character.

13. The non-transitory computer-readable medium of claim 12, wherein the operations further comprise:

after adjusting the dialog complexity parameter, loading the subsequent turn of the turn-based dialog according to the adjusted dialog complexity parameter without restarting the turn-based dialog.

14. The non-transitory computer-readable medium of claim 10, wherein outputting the second dialog comprises outputting at least one of a full dialog, a simple dialog, or a summary dialog corresponding to the second video game narrative.

15. The non-transitory computer-readable medium of claim 10, wherein outputting the second dialog comprises repeating the first dialog with a lower level of complexity.

16. The non-transitory computer-readable medium of claim 10, wherein the second dialog comprises both audio and written text, and wherein adjusting the dialog complexity parameter causes a change in complexity of either the audio or the written text.

17. The non-transitory computer-readable medium of claim 10, wherein outputting the second dialog comprises outputting the second video game narrative as a bulleted list with bold or underlined text.

18. The non-transitory computer-readable medium of claim 10, wherein the operations further comprise:

outputting a plurality of selectable character responses, wherein the user input corresponds to one of the selectable character responses.

19. A system comprising:

one or more processors; and memory storing instructions that, when executed by the one or more processors, cause the one or more processors to perform operations comprising:

loading a first dialog from a game database according to a dialog complexity parameter configured in user settings, the first dialog comprising a first video game narrative having a first complexity level;

outputting the first dialog;

receiving a user input associated with the first dialog, wherein the user input comprises a press of a button of a game controller;

adjusting the dialog complexity parameter in the user settings based on the user input;

increasing or decreasing a complexity level of a second dialog from the game database according to the adjusted dialog complexity parameter;

loading the second dialog, the second dialog comprising a second video game narrative having a second complexity level that differs from the first complexity level of the first video game narrative; and outputting the second dialog, wherein a short press of the button reduces the dialog complexity parameter, and wherein a long press of the button skips the second dialog entirely.

20. The system of claim 19, wherein the second dialog is a version of the first dialog with a different complexity level.

* * * * *